United States Patent [19]
Salenz

[11] 4,424,092
[45] Jan. 3, 1984

[54] FEED AND DISCHARGE APPARATUS FOR A LAMINATE PRESS

[75] Inventor: Dieter Salenz, Schwaigern, Fed. Rep. of Germany

[73] Assignee: Maschinenfabrik J. Dieffenbacher GmbH & Co., Eppingen, Fed. Rep. of Germany

[21] Appl. No.: 420,334

[22] Filed: Sep. 20, 1982

[51] Int. Cl.$^3$ .......................... B32B 31/00; B44C 7/00

[52] U.S. Cl. .................................... 156/391; 156/580; 156/581; 156/364; 156/379.8; 414/752; 248/363; 100/196; 100/218; 100/295

[58] Field of Search ......................... 414/752; 198/689; 100/196, 216, 215, 218, 295; 425/186, 193; 156/580, 581, 582, 583.1, 583.5, 391, 379.8, 362, 364, 569; 248/318, 320, 363, 669

*Primary Examiner*—Edward C. Kimlin
*Assistant Examiner*—Merrell C. Cashion
*Attorney, Agent, or Firm*—Schwartz, Jeffery, Schwaab, Mack, Blumenthal & Koch

[57] ABSTRACT

Apparatus for feeding a laminate pack into a press and for discharging the finished product such as a laminated, finished board. A plurality of lifters and holders arranged on support arms are provided along the longitudinal edge of the finished board to remove it from the press. These same support arms carry conveyors to transport the laminate pack into the press at the same time or before the finished board is discharged. Fast operating cycles are obtained by reducing the feeding and discharge operating times.

8 Claims, 8 Drawing Figures

FEED AND DISCHARGE APPARATUS FOR A LAMINATE PRESS

BACKGROUND OF THE INVENTION

The invention concerns an apparatus for the insertion, pressing and discharge of a laminate pack in and from a heated press.

A prior art feeding and discharge apparatus is shown in German patent DE-OS 29 28 231 incorporated herein by reference. As described therein, a laminate pack is seized by two conveyor belts run in on the longitudinal sides of the press, transported into the pressing area and held at a distance from the lower pressure platen until the conveyor belt has left the pressing area by moving in a lateral direction. The conveyor belts simultaneously transport the previously finished board resting on the platen from the press to the discharge side of the press. However, prior to the placement of the finished board onto the discharge conveyor belts, it is necessary to move the suction lifters into the press and to lift the finished board. As in short cycle installations of this type for the coating or heat treatment of particle boards, the handling times for the insertion and discharge of the material into and out of the press requires, by far, the longest period of time in relation to the pressing time itself. It is desirable in the industry to reduce the handling time in order to reduce the production costs of a treated plate.

SUMMARY OF THE INVENTION

It is an object of the invention to provide an apparatus whereby the handling time of the feeding and discharge process is further reduced in short cycle installations of a press.

The apparatus according to the invention has an advantage over the state of the art in that suction lifters are moved simultaneously with the suction boxes, gripping and holding the finished board, and move in combination with the conveyor belts, into the press, i.e. the process is shortened by one working step. In the installation according to the above-cited state of the art, the holding devices and the conveyor belts could be moved in only after the suction lifters had already lifted the finished board.

The invention may be characterized as a feeding and discharge apparatus for feeding a laminate pack into a press having upper and lower press cauls and for producing and discharging a finished board. The apparatus comprises (1) at least two lifters for lifting the finished board from the lower press caul after a pressing operation, (2) at least two holders for holding the finished board after lifting by the lifters, wherein said holders comprise a suction box having a sealing lip and spacer rollers for contacting said finished board, (3) at least two conveyor belts for conveying the laminate pack into the press between the upper and lower press cauls, (4) at least two feeder and discharge arms, one arm positioned for movement into and out of said press from each longitudinal side thereof, and in a direction transverse to the longitudinal side, and each arm supporting at least one lifter, holder and conveyor belt such that the lifter, holder and conveyor belt move together, as a unit, into and out of the press from the longitudinal side thereof, (5) means for moving the arms into and out of the press, and (6) means for discharging the finished board from the press while the finished board is held by the holders. Each of the arms is positioned within the press adjacent the longitudinal edge of the press for positioning the lifters and holders for contact with the finished board adjacent opposite longitudinal edges of the finished board and for conveying the laminate pack into the press by contact of the conveyor belts adjacent opposite longitudinal edges of the laminate pack. The arms are positioned outside of the area between the upper and lower press cauls for releasing the laminate pack between the upper and lower press cauls.

BRIEF DESCRIPTION OF THE DRAWINGS

FIGS. 1 to 8 show a preferred form of an embodiment of the apparatus according to the invention, wherein:

FIG. 1 shows a schematic representation of the apparatus according to the invention in a lateral elevation;

FIG. 2 shows a top view of the apparatus according to FIG. 1;

FIG. 3 shows a partial view of the apparatus according to FIG. 1 prepared to receive the finished board;

FIG. 4 shows the apparatus of FIG. 3 with the suction lifters in contact with the finished board;

FIG. 5 shows the apparatus according to FIG. 3 during the introduction of the laminate pack and the discharge (sliding out) of the finished board;

FIG. 6 shows the laminate board during its placement with the feeding means in its initial position;

FIG. 7 shows the feeder and discharge device in detail; and

FIG. 8 shows a cross section according to FIG. 7.

DETAIL DESCRIPTION OF THE PREFERRED EMBODIMENT

Figure 1:
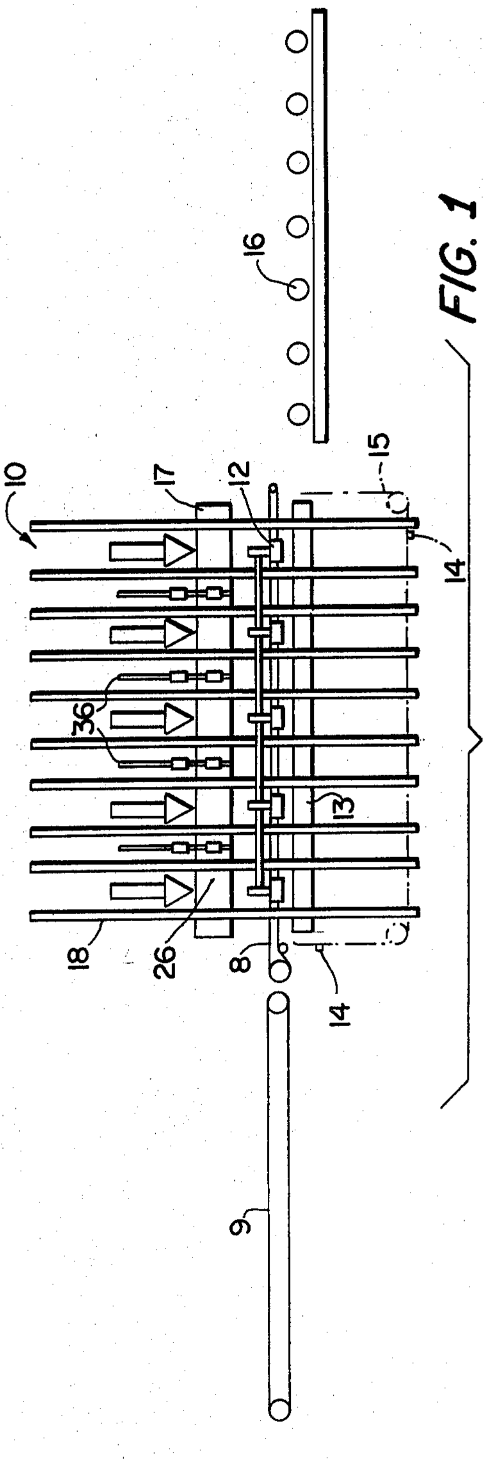

The apparatus represented in FIGS. 1 to 8 is used for (1) the introduction into a press 10 of a laminate pack 4 comprising layered material, for example top and bottom coating materials 1, 2 such as hardenable synthetic plastic films paper-impregnated with a synthetic resin and the like, and the substrate 19 of a chipboard or particle board, (2) the heat pressing of the laminate pack 4 in the press 10 between lower press platen 13 and upper press platen 17 to form a finished board 5, and (3) the discharge of the finished board 5 from the press 10.

Figure 2:
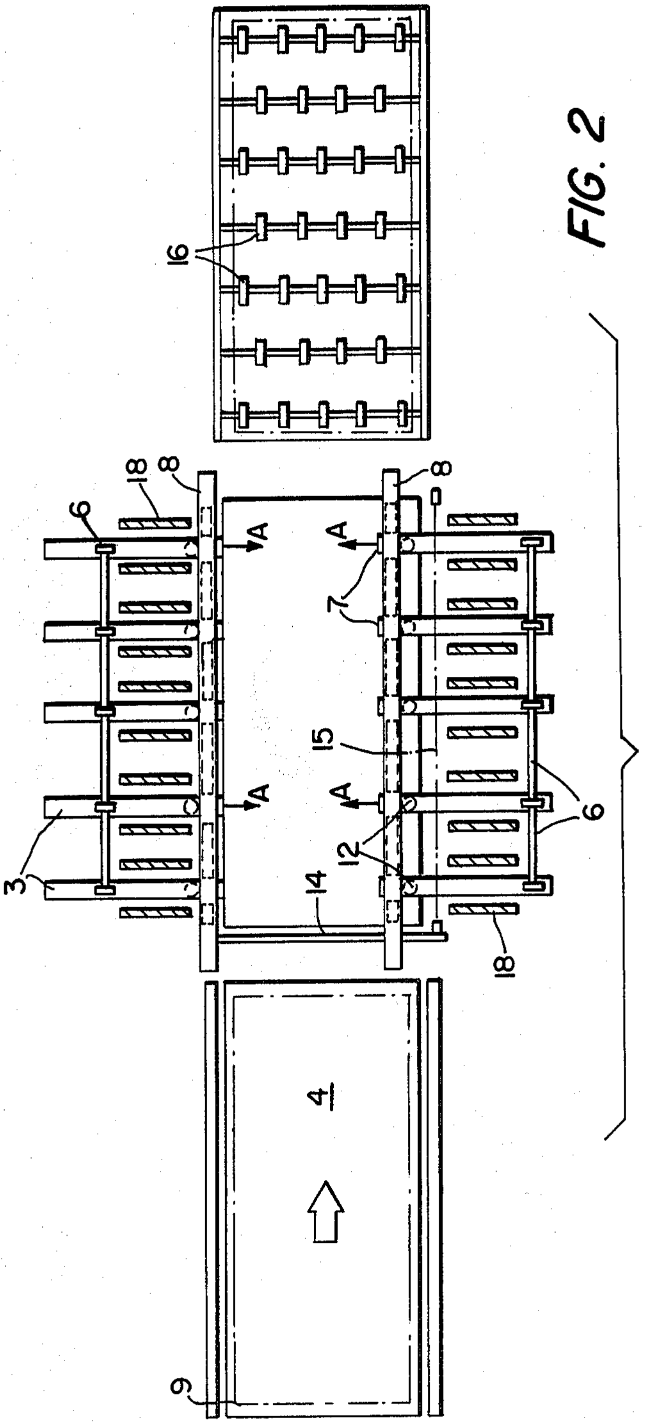
Figure 3:
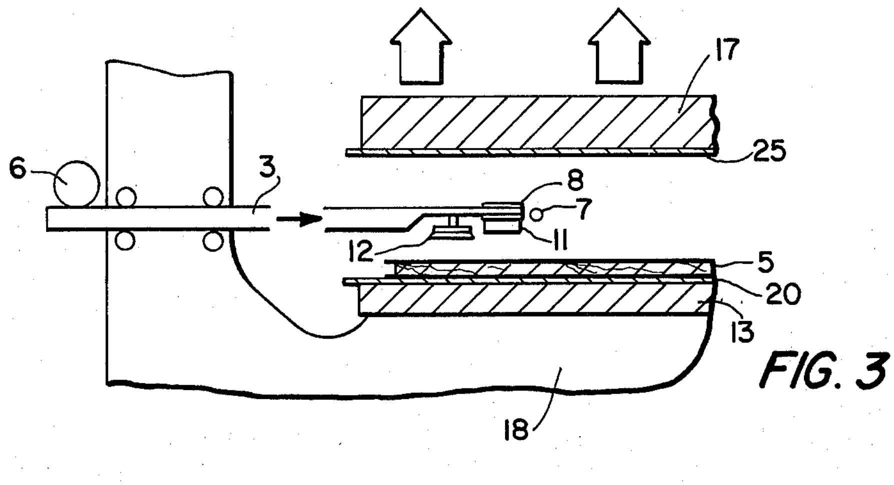

The overall view of the apparatus shown in FIGS. 1 and 2 illustrates from left to right the insertion of the laminate pack 4 into the press 10, and the discharge of the finished board 5 from the press 10. After the press 10 is opened, the feeder and discharge devices are moved into the press area. These devices include feeder and discharge arms 3 driven by rack and pinion drives 6 which move the feeder and discharge arms 3 into the press area in a direction transversely to the longitudinal direction of the press 10, from both of the longitudinal sides of the press, i.e., in the direction of arrows A in FIG. 2. The feeder and discharge devices for each side are of the same construction, and only one side, shown for example in FIG. 3, is illustrated for simplicity of explanation. FIG. 3 shows the feeder and discharge device to further include depositor rolls 7, suction lifters 12, a conveyor belt 8 and suction boxes 11.

Figure 4:
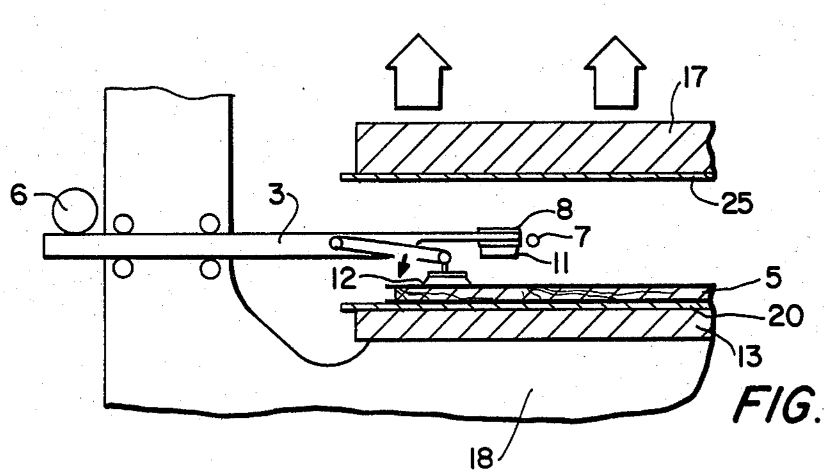
Figure 5:
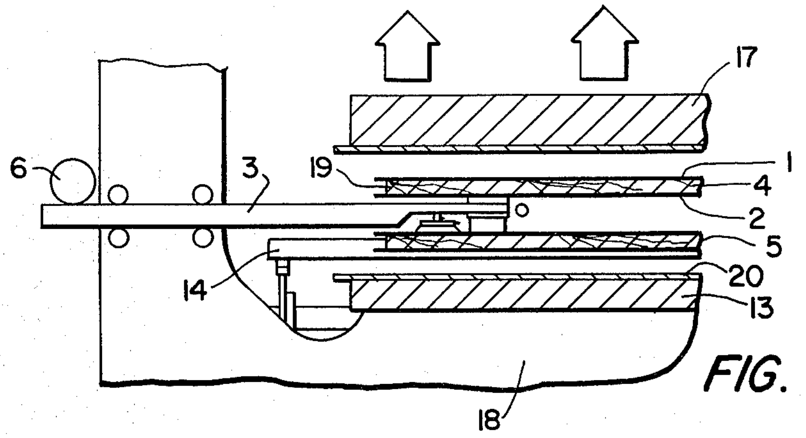
Figure 6:
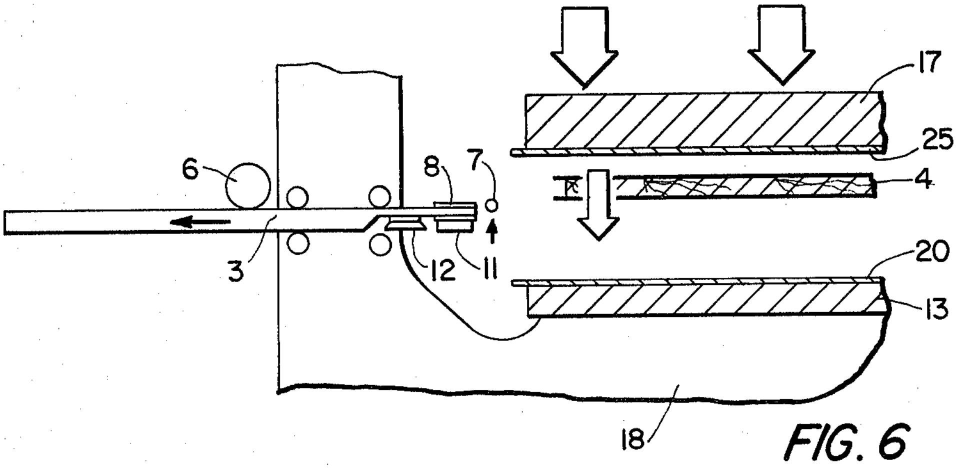
Figure 7:
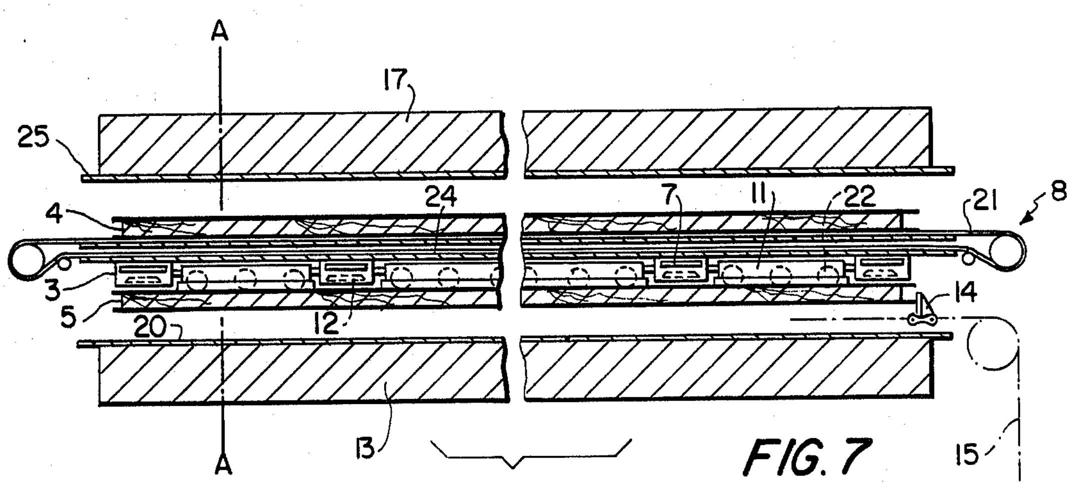
Figure 8:
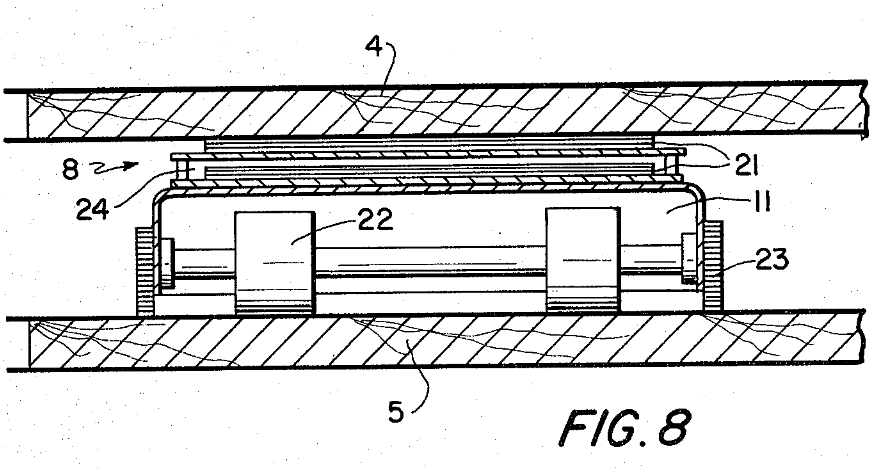

By means of a mechanical lever mechanism shown in FIG. 4, the suction lifters 12 (1) are lowered onto the finished board 5, (2) grip it, (3) remove it from support or lower press platen 13, and (4) transfer it while pivoting upward, to the suction boxes 11 (FIG. 5). The suction boxes 11, which are applying suction along the longitudinal edges of the board 5 by means of a high vacuum device (not shown), receive the board 5, while spacer rolls 22 within the suction boxes 11 regulate the distance between a sealing lip 23 (FIG. 8) and the finished board 5. The spacer rollers 22 are shown in phantom lines in FIG. 7 and are best illustrated in FIG. 8. Simultaneously with this process, the conveyor belts 8 seize the laminate pack 4 placed into motion by a feeder conveyor 9, and transport it into the press 10. In order to prevent sliding during acceleration and braking, the high temperature resistant feeder belts of the conveyors 8 are made in the form of perforated bands 21, and the top platen of the conveyor is made in the form of a vacuum suction plate 24 (see FIG. 8). During the assembly of the laminate pack 4, it may additionally be ionized. As soon as the transfer of the finished board 5 to the suction boxes 11 is completed, the finished board 5 is moved from the press area onto a discharge conveyor 16. This movement is achieved by means of a discharge ledge 14 connected to a chain drive 15 and positioned on both sides of the pressure platen 13 around the press table and press frame 18. The discharge ledge 14 moves the board from left to right as viewed from FIGS. 1 and 2. During its exit from the press 10, the finished board 5 moves below and across the suction boxes 11 aided by the spacer rollers and the suction boxes are successively deactivated by means of valves, upon the passage of the discharge ledge 14. Prior to or during discharge of board 5, the laminate pack 4 is being transported into the press area, so that at the end of the discharge process, the new laminate pack 4 is already on the conveyor belts 8 in a position to be deposited. Subsequently, the following working steps successively take place:

(a) almost simultaneously the vacuum under the perforated bands 21 is disconnected and the depositor rolls 7, connected to the feeder and discharge arm 3, move to contact the laminate pack 4 so that the perforated band 21 is no longer in contact with the laminate pack 4;

(b) the feeder and discharge devices 7, 8, 11 and 12 move to their initial positions toward the left as shown in FIG. 6 such that the laminate pack 4 is deposited onto the lower press platen 13 and lower caul 20; and (c) the press 10 closes and the pressing process is effected.

The apparatus according to the invention may be applied advantageously further during the changing of the lower caul 20 and upper caul 25, because the fastest execution possible is assured. In the process, the following working steps may be effected by the feeder and discharge device according to the invention;

(1) the insertion and deposition of a protective intermediate layer onto the lower caul 20 by means of the conveyor belts 8;

(2) the discharge of the sheet pack (caul 20, protective intermediate layer and caul 25) onto the discharge conveyor 16 by means of the conveyor belts 8. Prior to such discharge, a caul changing device 36 (FIG. 1) lifted the lower caul 20 with the protective intermediate layer to the upper caul 25, so that the conveyor belts 8 were able to move in under the lifted lower caul 20 to subsequently discharge the sheet pack;

(3) the new laminate pack is transported with the conveyor belts 8 into the press 10 and placed onto the lower press platen 13, whereupon the caul changing device 36 seizes the laminate pack and raises it to the upper press platen 17. After a caul clamping device 26 has removed the upper caul 25 and secured it to the upper press platen 17, the caul changing device 36 removes the caul 20 with the protective intermediate layer to the lower press platen 13. The lower caul changing device 26 receives the lower caul 20 and clamps it onto the lower press platen 13; and (4) the re-inserted feeder and discharge device lifts by means of the suction lifters 12 the protective intermediate layer to the suction boxes and transports it from the press 10 onto the conveyor 16.

The caul changing apparatus is more particularly described in copending application Ser. No. 420,333 entitled "Insertion and Removal Apparatus for Press Cauls" of Peter Rapp, incorporated herein by reference.

Although the invention has been described in terms of a preferred embodiment, modifications and improvements may be made by those skilled in the art without departing from the scope of the invention.

I claim:

1. Apparatus for feeding and discharging a laminate pack into a press having upper and lower press cauls for producing a finished board comprising (a) at least two lifters for lifting the finished board from the lower press caul after a pressing operation, (b) at least two holders for holding said finished board after lifting by said lifters, (c) at least two conveyor belts for conveying said laminate pack into said press between said upper and lower press cauls, (d) at least two feeder and discharge arms, one arm positioned for movement into and out of said press from each longitudinal side thereof, and in a direction transverse to said longitudinal side, and each arm supporting at least one lifter, holder and conveyor belt such that said lifter, holder and conveyor belt move together, as a unit, into and out of the press from each longitudinal side thereof, (e) each of said arms positioned within the area between said upper and lower press cauls of said press adjacent the longitudinal edge of said press for positioning said lifters and holders for contact with said finished board adjacent opposite longitudinal edges of said finished board and for conveying said laminate pack into said press by contact of said conveyor belts adjacent opposite longitudinal edges of said laminate pack, (f) said arms positioned outside of the area between said upper and lower press cauls for releasing said laminate pack between said upper and lower press cauls, (g) means for moving said arms into and out of the area between said upper and lower press cauls of said press, and (h) means for discharging said finished board from said press while said finished board is held by said holders, wherein said holders are positioned above said finished board and comprise a suction box having a sealing lip and spacer rollers for contacting said finished board and enabling longitudinal movement of said finished board while supported by said holders, said longitudinal movement produced by contact of said discharging means with said finished board.

2. Apparatus as recited in claim 1 wherein said conveyor belts position said laminate pack within said press prior to completion of discharge of said finished board by said discharge means.

3. Apparatus as recited in claim 1 wherein said discharge means comprises a discharge ledge contactable with said finished board and a drive means to move said ledge longitudinally across said press to remove said finished board.

4. Apparatus as recited in claim 1 wherein said discharge means is operable synchronously with said conveyor belts.

5. Apparatus as recited in claim 1 wherein said lifters and holders make suction contact with said finished board.

6. Apparatus as recited in claim 1 wherein said discharge means and conveyor belts operate simultaneously.

7. Apparatus as recited in claim 1 wherein said moving means comprises rack and pinion drive means.

8. Apparatus as recited in claim 1 wherein each of said at least two conveyor belts comprises perforated bands and vacuum suction plates supporting said bands for preventing slippage of said laminate pack during feeding of said laminate pack into said press.

* * * * *